(12) United States Patent
Huang et al.

(10) Patent No.: US 7,233,134 B2
(45) Date of Patent: Jun. 19, 2007

(54) DC-TO-DC CONVERTER WITH FAST LOAD TRANSIENT RESPONSE AND METHOD THEREOF

(75) Inventors: Kent Huang, Taoyuan (TW); Liang-Pin Tai, Tainan (TW); Hung-I Wang, Changhua (TW); Jian-Rong Huang, Hsinchu (TW); Kuo-Ping Liu, Hsinchu (TW); Yu-Fan Liao, Fengshan (TW)

(73) Assignee: Richtek Technology Corp., Hsinchu (TW)

( * ) Notice: Subject to any disclaimer, the term of this patent is extended or adjusted under 35 U.S.C. 154(b) by 204 days.

(21) Appl. No.: 10/846,569

(22) Filed: May 17, 2004

(65) Prior Publication Data
US 2004/0232900 A1 Nov. 25, 2004

(30) Foreign Application Priority Data
May 19, 2003 (TW) .............................. 92113518 A

(51) Int. Cl.
*G05F 1/40* (2006.01)
(52) U.S. Cl. ..................... 323/284; 323/276; 323/285
(58) Field of Classification Search ............... 323/222, 323/276, 282, 284, 285, 351
See application file for complete search history.

(56) References Cited

U.S. PATENT DOCUMENTS

| 6,140,808 | A  | * | 10/2000 | Massie ........................ 323/284 |
| 6,215,288 | B1 | * | 4/2001  | Ramsey et al. .............. 323/284 |
| 6,229,292 | B1 | * | 5/2001  | Redl et al. ................... 323/285 |
| 6,897,715 | B2 | * | 5/2005  | Barber et al. ................ 323/316 |
| 6,906,536 | B2 | * | 6/2005  | Pearce et al. ................ 323/282 |

* cited by examiner

*Primary Examiner*—Jessica Han
(74) *Attorney, Agent, or Firm*—Rosenberg, Klein & Lee

(57) ABSTRACT

A DC-to-DC converter comprises a sense circuit to sense the output voltage of the converter to generate a feedback signal, a transconductive amplifier to amplify a difference between the feedback signal and a threshold signal to generate a first current and to generate a second current in response to a load transient, a charging circuit connected with the first current to generate a charging voltage, a driver to compare the charging voltage with two reference signals to generate a pair of low-side and high-side driving signals, and a fast response circuit to compare a load transient signal corresponding to the second current with a third reference signal to generate a bypass signal to drive the output stage of the converter in the load transient.

13 Claims, 3 Drawing Sheets

DC-TO-DC CONVERTER WITH FAST LOAD TRANSIENT RESPONSE AND METHOD THEREOF

FIELD OF THE INVENTION

The present invention relates generally to a power conversion apparatus and method and more particularly, to a DC-to-DC converter with fast load transient response and method thereof.

BACKGROUND OF THE INVENTION

Widely applied to various electronic products, a DC-to-DC converter provides the functions of regulating the voltage level from a DC input voltage, such as boost or buck voltage conversion, and of maintaining the regulated voltage at the desired level. For example, in a computer system, due to the power supplies of different voltages for CPU, memory and hard disk drive, the DC-to-DC converter is required to regulate the power source voltage of the computer system to various supply voltages supplied to various operational units of the computer system.

Typically, a DC-to-DC converter modulates the duty cycle of an output stage by a driving signal, to thereby regulate the output voltage of the converter within a demanded range. In a conventional DC-to-DC converter, the output voltage of the converter is detected to generate a feedback signal, which feedback signal is compared with a threshold signal by an error amplifier to generate an error signal for a pulse width modulation (PWM) comparator to compare with a ramp signal to generate a PWM signal, and the PWM signal is supplied to a driver to drive the output stage. In this converter, an oscillator is generally employed to generate the ramp signal for the PWM comparator, so as to modulate the duty cycle of the PWM signal. Unfortunately, this modulation mechanism has a slow load transient response. When a load transient occurred, the load current changes instantly, such as suddenly raising of the load current causing the output voltage of the converter dropping rapidly, due to the duty cycle modulation resulted from comparison to the ramp signal, the converter is slow to respond to the load transient to recover the output voltage thereof to the original level. Therefore, it is desired a DC-to-DC converter with fast load transient response and method thereof.

SUMMARY OF THE INVENTION

One object of the present invention is to provide a DC-to-DC converter, by which fast load transient response is achieved.

In a DC-to-DC converter, according to the present invention, an output stage includes a pair of low-side and high-side switches connected in series to be switched to convert an input voltage an output voltage, a sense circuit senses the output voltage to generate a feedback signal, a transconductive amplifier amplifies a difference between the feedback signal and a threshold signal to generate a first current and responds to a load transient to generate a second current, a charging circuit is connected with the first current to generate a charging voltage, a driver compares the charging voltage with two reference signals to generate a pair of low-side and high-side driving signals, and a fast response circuit compares a load transient signal resulted from the second current with a third reference signal to generate a bypass signal to drive the output stage in a load transient.

BRIEF DESCRIPTION OF DRAWINGS

These and other objects, features and advantages of the present invention will become apparent to those skilled in the art upon consideration of the following description of the preferred embodiments of the present invention taken in conjunction with the accompanying drawings, in which.

DETAILED DESCRIPTION OF THE INVENTION

Figure 1:
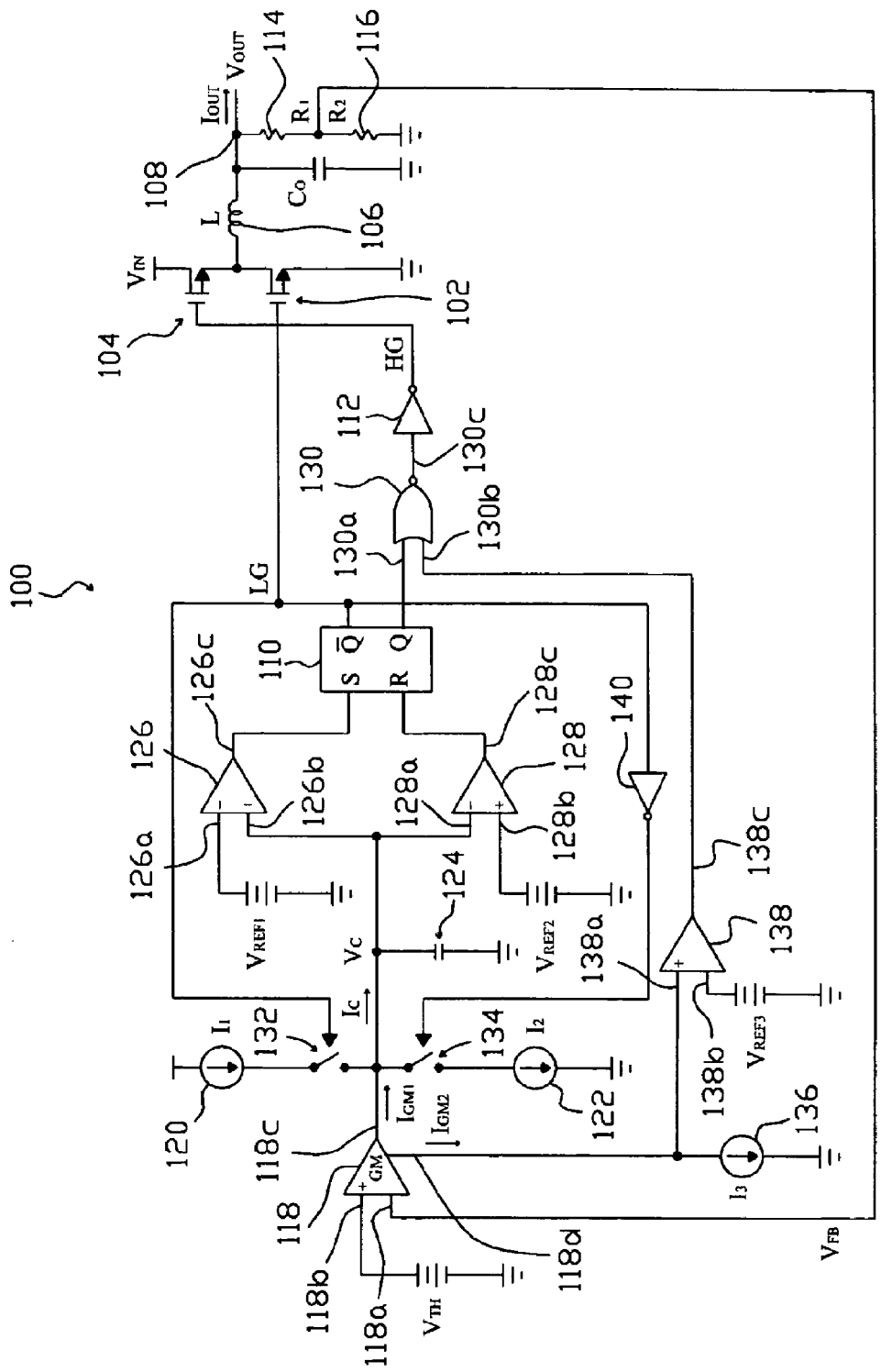
FIG. 1 shows a preferred DC-to-DC converter of the present invention.

FIG. 1 shows a preferred embodiment of the present invention. A DC-to-DC converter 100 comprises a pair of low-side NMOS 102 and high-side NMOS 104 connected in series as the output stage of the converter 100, of which the source of the low-side NMOS 102 is grounded, the drain of the low-side NMOS 102 is connected to the converter output 108 through an inductor 106, the source of the high-side NMOS 104 is connected to the converter output 108 through the inductor 106, the drain of the high-side NMOS 104 is connected with an input voltage $V_{IN}$, and the gates of the low-side NMOS 102 and high-side NMOS 104 are connected with low-side driving signal LG and high-side driving signal HG, respectively, to switch the low-side NMOS 102 and high-side NMOS 104 on and off to thereby generate an output current $I_{OUT}$ through the inductor 106 and an output voltage $V_{OUT}$ on the converter output 108 for a load. The output voltage $V_{OUT}$ is sensed by a sense circuit, including resistors 114 and 116 connected between the converter output 108 and ground as a voltage divider to divide the output voltage $V_{OUT}$, to generate a feedback signal $V_{FB}$. A transconductive amplifier 118 having an inverting input 118a connected with the feedback signal $V_{FB}$ and a non-inverting input 118b connected with a threshold signal $V_{TH}$, amplifies the difference between the feedback signal $V_{FB}$ and the threshold signal $V_{TH}$ to generate a current $I_{GM1}$ on its output 118c. The transconductive amplifier 118 also generates a current $I_{GM2}$ on another output 118d in response to a load transient, which load transient will result in the variation of the feedback signal $V_{FB}$ and thus determine the current $I_{GM2}$.

A charging circuit includes a capacitor 124 connected to the output 118c of the transconductive amplifier 118, and a current source 120 and a current sink 122 controlled by the driving signal LG and its inverse, respectively, to switch them to connect to the output 118c of the transconductive amplifier 118. Accordingly, the transconductive amplifier 118, current source 120 and current sink 122 determine a charging current $I_C$ to charge the capacitor 124 to thereby generate a charging voltage $V_C$. The current source 120 sources a current $I_1$, to the capacitor 124, and the current sink 122 sinks a current $I_2$ from the capacitor 124. As a result, the total charging current to charge the capacitor 124 is $$I_C = I_{GM1} + I_1 - I_2, \quad\quad\quad (EQ-1)$$

and from which, it is obvious to those skilled in the art that the charging rate of the capacitor 124 or the slew rate of the charging voltage $V_C$ can be controlled by controlling the currents $I_{GM1}$, $I_1$, and $I_2$ to determine the charging current $I_C$.

To generate the driving signals LG and HG, comparators 126 and 128 and an SR flip-flop 110 are configured to be a driver, of which the comparator 126 has its inverting input 126a and non-inverting input 126b connected with a reference signal $V_{REF1}$ and the charging voltage $V_C$, respectively, and its output 126c connected to the input S of the SR flip-flop 110, and the comparator 128 has its inverting input 128a and non-inverting input 128b connected with the charging voltage $V_C$ and a reference signal $V_{REF2}$, respectively, and its output 128c connected to the input R of the SR flip-flop 110. The comparator 126 compares the charging voltage $V_C$ with the reference voltage $V_{REF1}$ to generate a first comparator signal on its output 126c supplied to the input S of the SR flip-flop 110, and the comparator 128 compares the charging voltage $V_C$ with the reference voltage $V_{REF2}$ to generate a second comparator signal on its output 128c supplied to the input R of the SR flip-flop 110, by which the pair of complementary outputs Q and $\overline{Q}$ of the SR flip-flop 110 are generated and determine the low-side and high-side driving signals LG and HG. The complementary output $\overline{Q}$ of the SR flip-flop 110 is directly connected to the gate of the low-side NMOS 102 for the low-side driving signal LG, and in steady state, the output Q of the SR flip-flop 110 will be the high-side driving signal HG and connected to the gate of the high-side NMOS 104 through a NOR gate 130 and an inverter 112. When the first and second comparator signals 126c and 128c push the SR flip-flop 110 to have its output Q to a high-level and its complementary output $\overline{Q}$ to a low-level, the high-side NMOS 104 is turned on and the low-side NMOS 102 is turned off. Contrarily, when the first and second comparator signals 126c and 128c push the SR flip-flop 110 to have its output Q to a low-level and its complementary output $\overline{Q}$ to a high-level, the high-side NMOS 104 is turned of and the low-side NMOS 102 is turned on. On the other hand, the complementary output $\overline{Q}$ of the SR flip-flop 110 controls the switch 132, so as to switch the current source 120 to connect or disconnect the current $I_1$ to the capacitor 124. The complementary output $\overline{Q}$ of the SR flip-flop 110 also controls the switch 134 by an inverter 140, so as to sink the current $I_2$ from the capacitor 124 or not. By turning the switches 132 and 134 on and off, in conjunction with the current $I_{GM1}$, the charging current $I_C$ is determined, and thus the charging rate of the capacitor 124, i.e., the slew rate of the charging voltage $V_C$, is modulated, thereby regulating the duty cycle of the output Q or $\overline{Q}$ of the SR flip-flop 110. Since the signals Q and $\overline{Q}$ are used for the driving signals LG and HG of the switches 102 and 104 of the output stage, the duty cycle of the signals Q and $\overline{Q}$ will determine the output voltage $V_{OUT}$ of the converter 100.

A fast response circuit is further introduced into the converter 100 for fast load transient response, of which a current source 136 is connected to the output 118d of the transconductive amplifier 118, a comparator 138 has its non-inverting input 138a and inverting input 138b connected to the output 118d of the transconductive amplifier 118 and a reference signal $V_{REF3}$, respectively, the NOR gate 130 NORs the output Q of the SR flip-flop 110 and the output 138c of the comparator 138, and the inverter 112 inverts the output 130c of the NOR gate 130 to generate the high-side driving signal HG. In steady state, the output voltage $V_{OUT}$ is substantially the desired value, resulting in the feedback signal $V_{FB}$ substantially equal to the predetermined threshold signal $V_{TH}$, and the converter 100 behaves as a conventional one. When a load transient occurred, however, the feedback signal $V_{FB}$ changes due to the output voltage $V_{OUT}$ departing from the original value, and this variation will presents in the currents $I_{GM1}$ and $I_{GM2}$ simultaneously. With the varied current $I_{GM1}$, the charging circuit and driver will respond thereto as they are used to do, to adjust the pair of signals Q and $\overline{Q}$. However, the fast response circuit also responds to this load transient by the varied current $I_{GM2}$. The non-inverting input 138a of the comparator 138 connected with the current $I_{GM2}$ and current source 136 is a high-impedance node, and the variation of the current $I_{GM2}$ in response to the load transient will result in a load transient signal thereon, by which the comparator 138 generates a bypass signal on its output 138c, and this bypass signal becomes the high-side driving signal HG through the NOR gate 130 and inverter 112 to turn on the high-side NMOS 104 in the load transient. Since the bypass signal is generated by the fast response circuit, instead of the charging circuit and driver, the low response mechanism of the charging circuit and driver is avoided in the load transient to switch the high-side NMOS 104. The bypass signal replaces the output Q of the SR flip-flop 110 to drive the high-side NMOS 104 instantly in the load transient, thereby achieving the fast response of the output voltage $V_{OUT}$ to the load transient.

The DC-to-DC converter 100 has three operational modes set up by the transconductive amplifier 118. Under the delta-sigma mode, the current $I_{GM1}$ flows from the capacitor 124 into the amplifier 118, i.e., the amplifier 118 has current sinking capability, and the converter 100 modulates the duty cycle of the high-side NMOS 104 and low-side NMOS 102 by the difference between the feedback signal $V_{FB}$ and threshold signal $V_{TH}$. Under the hysteresis mode, the current $I_{GM1}$ is able to flow into or out from the amplifier 118, i.e., the amplifier 118 is capable of sinking or sourcing current, and the converter 100 modulates the output voltage $V_{OUT}$ within a demanded range. Under the valley mode, the current $I_{GM1}$ flows out from the amplifier 118 to the capacitor 124, i.e., the amplifier 118 is sourcing current, and the converter 100 maintains the output voltage $V_{OUT}$ at a low level.

According to equation EQ-1, under the three operational modes, the value of the current $I_{GM1}$, influences the value of the charging current $I_C$. Under the delta-sigma mode, the amplifier 100 is sinking current, and the current $I_{GM1}$, flows into the amplifier 118, thereby the magnitude of the current $I_1$ equal to the sum of the magnitudes of the charging current $I_C$, current $I_2$ and current $I_{GM1}$, i.e., $$|I_C|+|I_2|+|I_{GM1}|=|I_1| \tag{EQ-2}$$

Under the hysteresis mode, the amplifier 118 is sinking or sourcing current, and therefore, the current $I_{GM1}$ changes the charging current $I_C$ by sinking therefrom or sourcing thereto following equation EQ-1. Under the valley mode, the amplifier 118 is sourcing current, and the current $I_{GM1}$ thus flows out from the amplifier 118, thereby the sum of the magnitudes of the currents $I_{GM1}$, and $I_1$ equal to the sum of the magnitudes of the charging current $I_C$ and current $I_2$.

For a typical application, the currents $I_1$ and $I_2$ of the current source 120 and current sink 122 of the converter 100 have a ratio there between proportional to the ratio of the input voltage $V_{IN}$ to the output voltages $V_{OUT}$.

In any circumstances, the transconductive amplifier 118 adjusts the current $I_{GM1}$ so that the charging voltage $V_C$ on the capacitor 124 changes corresponding to the current $I_{GM1}$, to control the duty cycle of the high-side NMOS 104 and low-side NMOS 102, and once load transient occurred, the transconductive amplifier 118 generates the current $I_{GM2}$ in response to the load transient so that a bypass signal is immediately generated by the comparator 138 to control the duty cycle of the high-side NMOS 104, thereby the converter 100 having fast load transient response.

Figure 2:
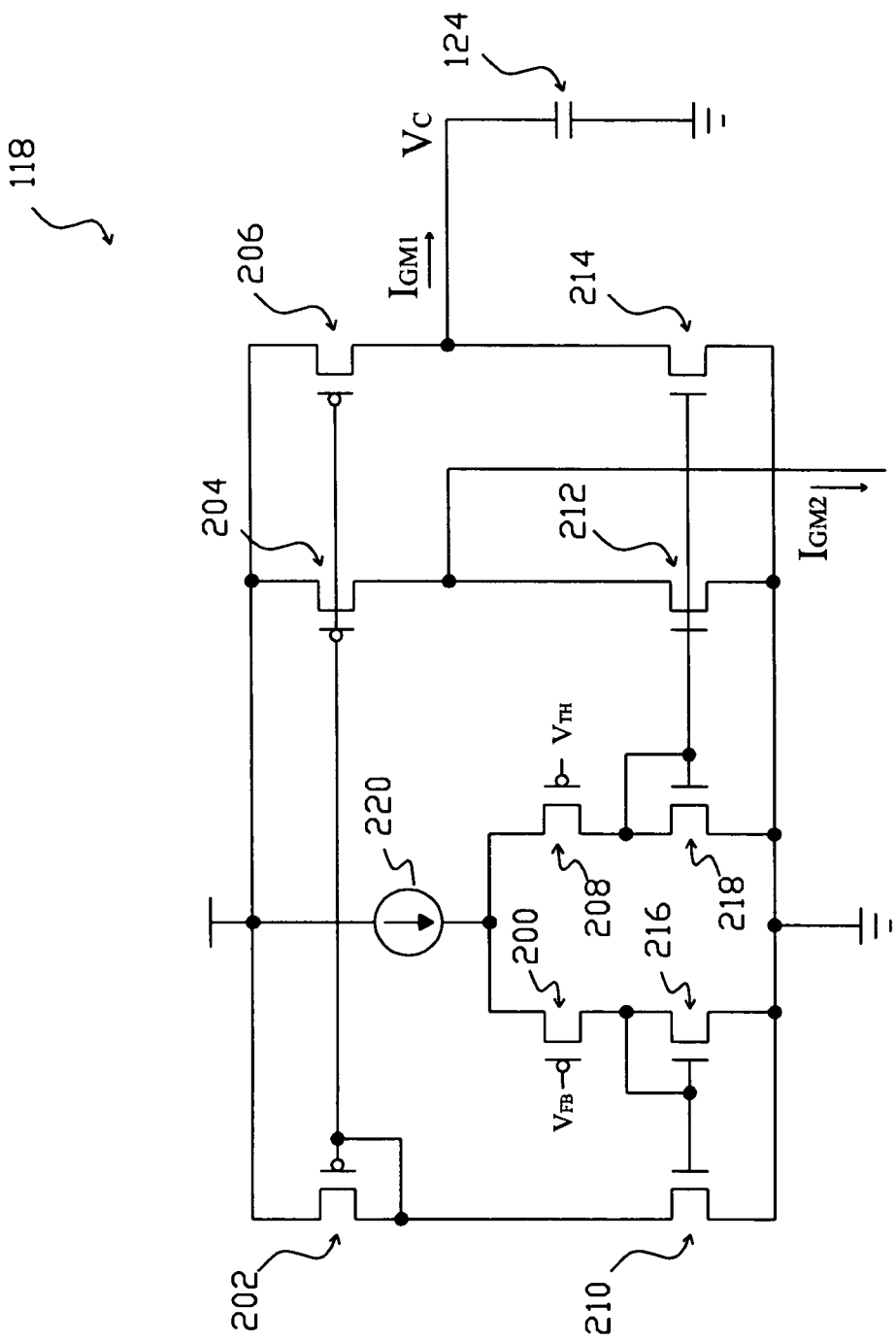
FIG. 2 shows an embodiment for the transconductive amplifier 118 of the converter 100 shown in FIG. 1.

FIG. 2 shows an embodiment for the transconductive amplifier 118 of the converter 100 shown in FIG. 1, which comprises PMOSes 200, 202, 204, 206 and 208, NMOSes 210, 212, 214, 216 and 218, and a current source 220. The source of the PMOS 200 is connected to the source of the PMOS 208, the drain of the PMOS 200 is connected to the drain and gate of the NMOS 216, the drain of the PMOS 208 is connected to the drain and gate of the NMOS 218, the source of the PMOS 202 is connected to the sources of the PMOSes 204 and 206, the gate and drain of the PMOS 202 are connected to the gates of the PMOSes 204 and 206, the drain of the PMOS 202 is connected to the drain of the NMOS 210, the drain of the PMOS 204 is connected to the drain of the NMOS 212, the drain of the PMOS 206 is connected to the drain of the NMOS 214, the gate of the NMOS 210 is connected to the gate of the NMOS 216, the gate of the NMOS 214 is connected to the gates of the NMOSes 212 and 218, the sources of the NMOSes 210, 212, 214, 216, 218 are grounded, the current source 220 is connected between the sources of the PMOSes 202 and 200, the gate of the PMOS 200 is connected with the feedback signal $V_{FB}$, the gate of the PMOS 208 is connected with the threshold signal $V_{TH}$, the drains of the PMOS 206 and NMOS 214 are connected to the capacitor 124, and the drains of the PMOS 204 and NMOS 212 are connected to the inverting input 138a of the comparator 138. The three operational modes, delta-sigma mode, hysteresis mode and valley mode, of the converter 100 are determined by the type of the transconductive amplifier 118. The circuit shown in FIG. 2 is the transconductive amplifier 118 for the converter 100 under the hysteresis mode, and by which, when the threshold signal $V_{TH}$ is larger than the feedback signal $V_{FB}$, the PMOS 206 is turned on and generates a current $I_{GM1}$, flowing to the capacitor 124, and contrarily, when the threshold signal $V_{TH}$ is smaller than the feedback voltage $V_{FB}$, the NMOS 214 is turned on and sinks a current $I_{GM1}$ flowing from the capacitor 124 to the transconductive amplifier 118. Therefore, the transconductive amplifier 118 shown in FIG. 2 under the hysteresis mode is capable of sinking and sourcing current. The transconductive amplifier 118 under the delta-sigma mode is that circuit shown in FIG. 2 but without the PMOS 206 and is only capable of sinking current. The transconductive amplifier 118 under the valley mode is that circuit shown in FIG. 2 but without the NMOS 214 and is only capable of sourcing current.

The larger the difference between the threshold signal $V_{TH}$ and feedback signal $V_{FB}$ is, the larger the duty cycle of the high-side NMOS 104 is, and vise versa. Under the delta-sigma mode, the duty cycles of the high-side NMOS 104 and low-side NMOS 102 are modulated in response to the difference between the threshold signal $V_{TH}$ and feedback signal $V_{FB}$, thereby controlling the output voltage $V_{OUT}$ within a demanded range.

Referring to FIG. 2, when the threshold signal $V_{TH}$ is larger than the feedback signal $V_{FB}$, i.e., load transient is occurred, the drains of the PMOS 204 and NMOS 212 output the current $I_{GM2}$ to the comparator 138 to generate the bypass signal to directly drive the high-side NMOS 104, thereby achieving fast response to the load transient.

Figure 3:
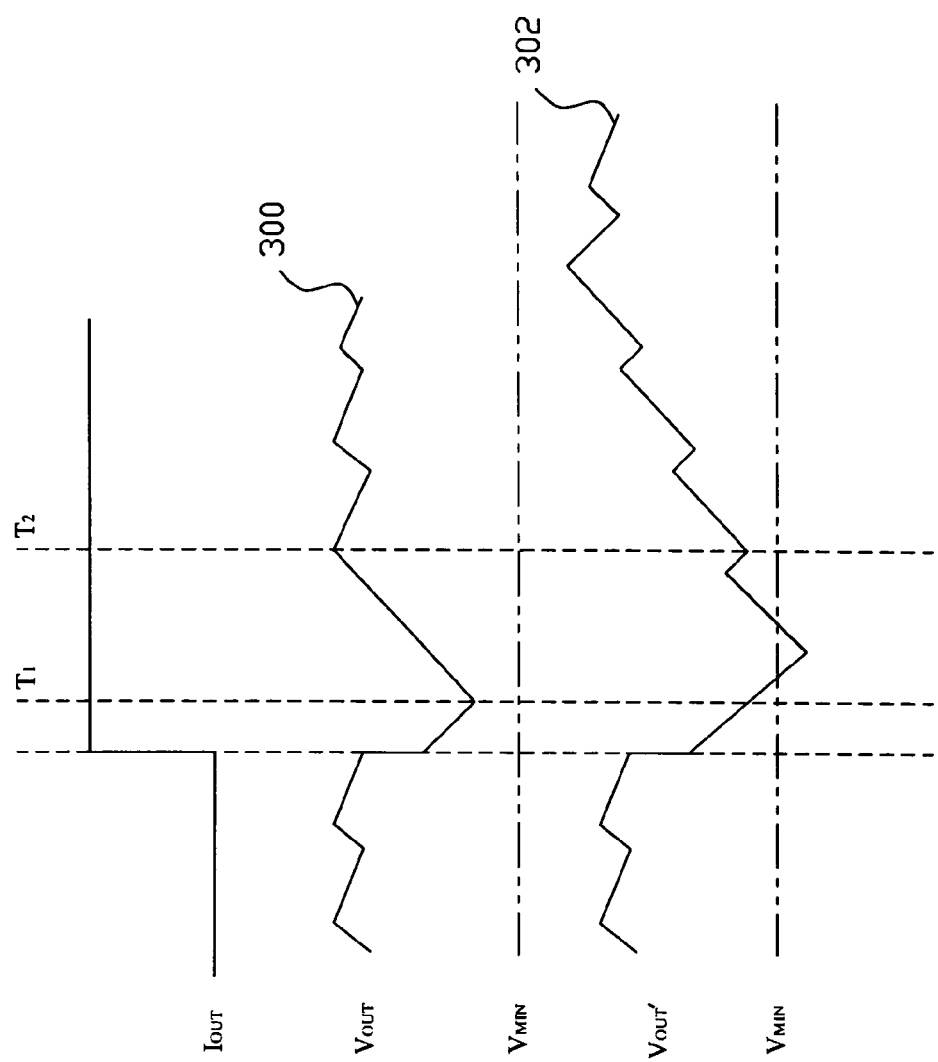
FIG. 3 shows a comparison of the output voltage waveforms of a DC-to-DC converter of the present invention and a conventional DC-to-DC converter in a load transient.

FIG. 3 shows a comparison of the output voltage waveforms of a DC-to-DC converter of the present invention and a conventional DC-to-DC converter in a load transient. Waveform 300 is representative of the output voltage $V_{OUT}$ of a converter of the present invention in response to a load transient, and waveform 302 is representative of the output voltage $V_{OUT}'$ of a conventional converter in response to a load transient. When the output current $I_{OUT}$ increasing due to load transient, the fast response circuit of the present invention fast responds by the comparator 138 generating a bypass signal of high-level on its output 138c to directly adjust the duty cycle of the high-side NMOS 104, and therefore, comparing the output voltage waveform 300 of the present invention and the output waveform 302 of a conventional one, at time T1, the output voltage $V_{OUT}$ of the present invention begins to increase by adjusting the duty cycle of the high-side NMOS 104, while the conventional output voltage $V_{OUT}'$ has to decrease to below the lowest voltage $V_{MIN}$ before increasing. As a result, at time T2, the output voltage $V_{OUT}$ of the present invention reaches the setup value, while the conventional output voltage $V_{OUT}'$ is still lower than the setup value and needs a longer response time before recovered. In other words, the converter of the present invention is capable of responding to load transient faster than the conventional one.

While the present invention has been described in conjunction with preferred embodiments thereof, it is evident that many alternatives, modifications and variations will be apparent to those skilled in the art. Accordingly, it is intended to embrace all such alternatives, modifications and variations that fall within the spirit and scope thereof as set forth in the appended claims.

What is claimed is:

1. A DC-to-DC converter with fast load transient response, comprises:
   an output stage including a pair of high-side and low-side switches connected in series for being switched to convert an input voltage to an output voltage;
   a sense circuit for sensing said output voltage to thereby generate a feedback signal;
   a transconductive amplifier for generating a first current by amplifying a difference between said feedback signal and a threshold signal, and a second current in response to a load transient;
   a charging circuit connected with said first current for generating a charging voltage accordingly;
   a driver for generating a pair of high-side and low-side driving signals by comparing said charging voltage with a first and second reference signals to switch said pair of high-side and low-side switches; and
   a fast response circuit for comparing a load transient signal corresponding to said second current with a third reference signal to thereby generate a bypass signal to drive said output stage.

2. The converter according to claim 1, wherein said charging circuit comprises:
   a charging node connected with said first current;
   a capacitor connected to said charging node for generating said charging voltage by charged thereto; and
   a pair of current source and current sink controlled by one of said pair of high-side and low-side driving signals to be connected to said capacitor.

3. The converter according to claim 2, wherein said pair of current source and current sink have a current ratio proportional to a voltage ratio of said input and output voltages.

4. The converter according to claim 1, wherein said driver comprises:
   a first comparator for generating a first comparator signal by comparing said charging voltage with said first reference signal;

a second comparator for generating a second comparator signal by comparing said charging voltage with said second reference signal; and a flip-flop for receiving said first and second comparator signals to thereby generate said pair of high-side and low-side driving signals.

5. The converter according to claim 4, wherein said flip-flop comprises an SR flip-flop.

6. The converter according to claim 1, wherein said fast response circuit comprises:

a comparator having a first input connected with a bias current and said second current, a second input connected with said third reference signal, and an output for generating said bypass signal; and a circuit for connecting said bypass signal to said output stage.

7. The converter according to claim 1, wherein said first current flows into said transconductive amplifier under a delta-sigma mode.

8. The converter according to claim 1, wherein said first current flows into or out from said transconductive amplifier under a hysteresis mode.

9. The converter according to claim 1, wherein said first current flows out from said transconductive amplifier under a valley mode.

10. A method for fast load transient response in a DC-to-DC converter having a pair of high-side and low-side switches connected in series for being switched to convert an input voltage to an output voltage, said method comprising the steps of:

sensing said output voltage for generating a feedback signal;

amplifying a difference between said feedback signal and a threshold signal for generating a first current;

generating a second current in response to a load transient;

generating a charging voltage including using said first current;

comparing said charging voltage with a first and second reference signals for generating a pair of high-side and low-side driving signals to drive said pair of high-side and low-side switches; and comparing a load transient signal corresponding to said second current with a third reference signal for generating a bypass signal to drive said high-side switch.

11. The method according to claim 10, wherein the step of generating a charging voltage comprises the steps of:

charging a capacitor by said first current;

switching a third current by one of said pair of high-side and low-side driving signals for charging said capacitor; and switching a current sink by one of said pair of high-side and low-side driving signals for discharging said capacitor.

12. The method according to claim 10, wherein the step of comparing said charging voltage with a first and second reference signals comprises the steps of:

comparing said charging voltage with said first reference signal for generating a first comparator signal;

comparing said charging voltage with said second reference signal for generating a second comparator signal; and generating said pair of high-side and low-side driving signals by connecting said first and second comparator signals to a flip-flop.

13. A method for improving load transient response in a DC-to-DC converter including an output stage to convert an input voltage to an output voltage, said method comprising the steps of:

generating a bypass signal in response to a load transient on said output voltage; and driving said output stage by said bypass signal;

wherein the step of generating a bypass signal comprises the steps of:

sensing said output voltage for generating a feedback signal;

amplifying a difference between said feedback signal and a threshold signal for generating a current; and comparing a load transient signal corresponding to said current with a reference signal for generating said bypass signal.

* * * * *